(12) United States Patent
Ukita et al.

(10) Patent No.: US 7,257,398 B1
(45) Date of Patent: Aug. 14, 2007

(54) TELEPHONE SET, COMMUNICATION ADAPTOR, HOME APPLIANCE CONTROL METHOD, AND PROGRAM RECORDING MEDIUM

(75) Inventors: Yoshitaka Ukita, Tokyo (JP); Hiroshi Kakuda, Kanagawa (JP); Masakazu Hattori, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 09/710,129

(22) Filed: Nov. 10, 2000

(30) Foreign Application Priority Data

Nov. 12, 1999 (JP) ................................. 11-323439

(51) Int. Cl.
*H04M 3/00* (2006.01)

(52) U.S. Cl. ...................... 455/420; 455/418; 455/419; 455/41.2; 455/3.05; 455/3.06; 455/567; 379/102.01; 379/102.03; 348/14.05

(58) Field of Classification Search ........ 455/418–420, 455/41.1–41.2, 3.01–3.06, 556.1–556.2, 455/557, 567, 569.1, 90.1–91.2, 73–74.1, 455/552.1; 340/825.71–825.72; 379/90.01, 379/102.01–102.07, 110.01; 348/14.02–14.05
See application file for complete search history.

(56) References Cited

U.S. PATENT DOCUMENTS

| | | | |
|---|---|---|---|
| 4,418,427 A * | 11/1983 | Muterspaugh | 455/180.2 |
| 5,319,798 A * | 6/1994 | Watanabe | 455/76 |
| 5,542,102 A | 7/1996 | Smith et al. | |
| 5,636,211 A * | 6/1997 | Newlin et al. | 370/465 |
| 5,671,267 A * | 9/1997 | August et al. | 455/420 |
| 5,802,467 A * | 9/1998 | Salazar et al. | 455/420 |
| 5,875,395 A * | 2/1999 | Holmes | 455/420 |
| 5,920,806 A | 7/1999 | Gouessant | |
| 5,963,624 A * | 10/1999 | Pope | 379/110.01 |
| 6,061,435 A * | 5/2000 | Grundvig et al. | 379/102.03 |

(Continued)

FOREIGN PATENT DOCUMENTS

DE 299 12 828 11/1999

(Continued)

OTHER PUBLICATIONS

Haartsen J et al. "Bluetooth: Vision, Goals, and Architecture" Mobile Computing and Communications Review, ACM, New York, NY, US, vol. 2, No. 4, Oct. 1, 1998, pp. 38-45, XP000784002 ISSN: 1091-1669.

*Primary Examiner*—Matthew D. Anderson
*Assistant Examiner*—Tuan Tran
(74) *Attorney, Agent, or Firm*—Finnegan, Henderson, Farabow, Dunner, LLC

(57) ABSTRACT

The invention relates to a telephone set comprises a connection apparatus to execute a connecting process for enabling transmission and reception of an information signal to and from a home appliance such as a general audio device remote-controllable by radio communication; a control apparatus for generating, upon arrival of an incoming call, a remote control signal such as a pause command to the home appliance; and a radio communication apparatus for sending the remote control signal to the home appliance by radio communication. Thus, upon arrival of an incoming call at the telephone set, the remote control signal is sent to the audio device or the like either directly from the telephone set or via a communication adaptor installed therein, hence pausing or muting the output of the audio device under remote control. Such control action enables a user to perceive the incoming call with facility.

43 Claims, 15 Drawing Sheets

U.S. PATENT DOCUMENTS

| | | | |
|---|---|---|---|
| 6,157,319 A * | 12/2000 | Johns et al. | 340/825.72 |
| 6,212,282 B1 * | 4/2001 | Mershon | 381/77 |
| 6,243,022 B1 * | 6/2001 | Furukawa | 340/825.72 |
| 6,366,572 B1 * | 4/2002 | Esterberg et al. | 370/343 |
| 6,407,779 B1 * | 6/2002 | Herz | 349/734 |
| 6,466,832 B1 * | 10/2002 | Zuqert et al. | 700/94 |
| 6,470,189 B1 * | 10/2002 | Hill et al. | 455/517 |
| 6,532,592 B1 * | 3/2003 | Shintani et al. | 725/141 |
| 2002/0197955 A1 * | 12/2002 | Witkowski et al. | 455/41 |

FOREIGN PATENT DOCUMENTS

| | | | |
|---|---|---|---|
| GB | 2 308 775 | | 7/1997 |
| JP | 60241383 | * | 11/1985 |
| JP | 09-018797 | | 1/1997 |

* cited by examiner

FIG. 6

AV PROTOCOL PACKET

| DESTINATION ID | SOURCE ID | RESPONSE /COMMAND | CONTENT OF COMMAND | CH NO. | ... |

FIG. 7

DATA PACKET

| DESTINATION ID | SOURCE ID | | Format | MUSIC DATA |

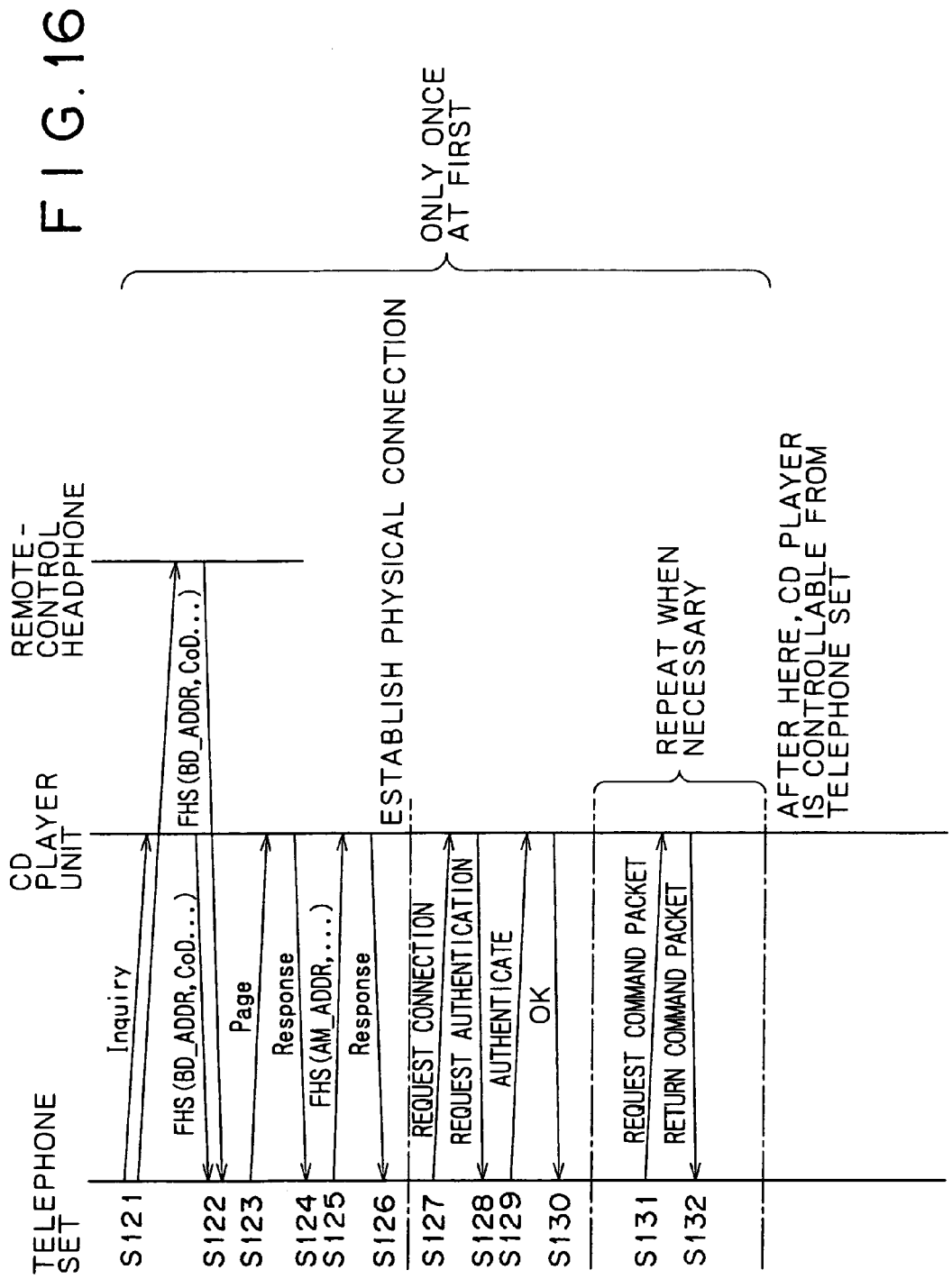

TELEPHONE SET, COMMUNICATION ADAPTOR, HOME APPLIANCE CONTROL METHOD, AND PROGRAM RECORDING MEDIUM

BACKGROUND OF THE INVENTION

The present invention relates to a telephone set, a communication adaptor, a home appliance control method, and a program recording medium which are capable of remote-controlling a home appliance such as an audio device upon arrival of an incoming call.

There has been known heretofore a situation where a user listening to an audio device fails to notice arrival of an incoming call at a telephone set, since it is difficult to perceive the ringing tone of the telephone set due to the sound being emitted from headphones or speakers. For prevention of such inconvenience, there is provided a system which mutes or temporarily stops the audio device upon arrival of an incoming call at the telephone set.

For example, a system is disclosed in Japanese Patent Laid-open No. Hei 9-18797, wherein an audio device such as a radio receiver or the like is informed of arrival of an incoming call at a telephone set by an exclusive radio means. According to this system, the audio device such as a radio receiver is muted in response to the information indicative of the incoming call, and then reproduces a prepared ringing tone to notify the user of the incoming call.

In the system mentioned above, it is necessary to additionally equip the audio device with exclusive hardware for detecting arrival of an incoming call at the telephone set. And a program is also required for controlling the operation at detection of the incoming call. Consequently, it becomes necessary to employ a specific audio device designed with an intention for notice of an incoming call, or to employ a combination with an additional unit.

SUMMARY OF THE INVENTION

It is therefore an object of the present invention to perform a control action of stopping the output of a home appliance, such as a general audio device or the like, upon arrival of an incoming call at a telephone set, thereby enabling a user to perceive the incoming call with facility.

In the present invention, a remote-control signal is sent, upon arrival of an incoming call at a telephone set, to a home appliance such as an audio device remote-controllable by radio communication, either directly from the telephone set or via a communication adaptor, thereby stopping the output of the home appliance under remote control.

According to a first aspect of the present invention, there is provided a telephone set which comprises a connection means to execute a connecting process for enabling transmission and reception of an information signal to and from a home appliance remote-controllable by radio communication; a control means for generating, upon arrival of an incoming call, a remote control signal to the home appliance; and a radio communication means for sending the remote control signal to the home appliance by radio communication.

According to a second aspect of the present invention, there is provided a communication adaptor installable in a telephone set. The communication adaptor comprises a connection means to execute a connecting process for enabling transmission and reception of an information signal to and from a home appliance remote-controllable by radio communication; a control means for generating, upon arrival of an incoming call, a remote control signal to the home appliance; and a radio communication means for sending the remote control signal to the home appliance by radio communication.

According to a third aspect of the present invention, there is provided a home appliance control method which comprises a connection processing step for enabling transmission and reception of an information signal to and from a home appliance remote-controllable by radio communication; a remote-control signal generating step for generating, upon arrival of an incoming call, a remote control signal to the home appliance; and a remote-control signal sending step for sending the remote control signal to the home appliance by radio communication.

And according to a fourth aspect of the present invention, there is provided a program recording medium where a home appliance control program is recorded in such a manner as to be readable and executable by a computer. The control program comprises a connection processing step for enabling transmission and reception of an information signal to and from a home appliance remote-controllable by radio communication; a remote-control signal generating step for generating, upon arrival of an incoming call, a remote control signal to the home appliance; and a remote-control signal sending step for sending the remote control signal to the home appliance by radio communication.

The above and other features and advantages of the present invention will become apparent from the following description which will be given with reference to the illustrative accompanying drawings.

BRIEF DESCRIPTION OF THE DRAWINGS

FIG. 6 is a diagram typically showing the composition of an A/V protocol packet in the audio system;

FIG. 7 is a diagram typically showing the composition of a data packet in the audio system;

FIG. 16 is a diagram typically showing a further procedure of communication between the telephone set and the portable CD player based on the BT protocol.

DETAILED DESCRIPTION OF THE PREFERRED EMBODIMENTS

Hereinafter some preferred embodiments of the present invention will be described in detail with reference to the accompanying drawings.

Figure 1:
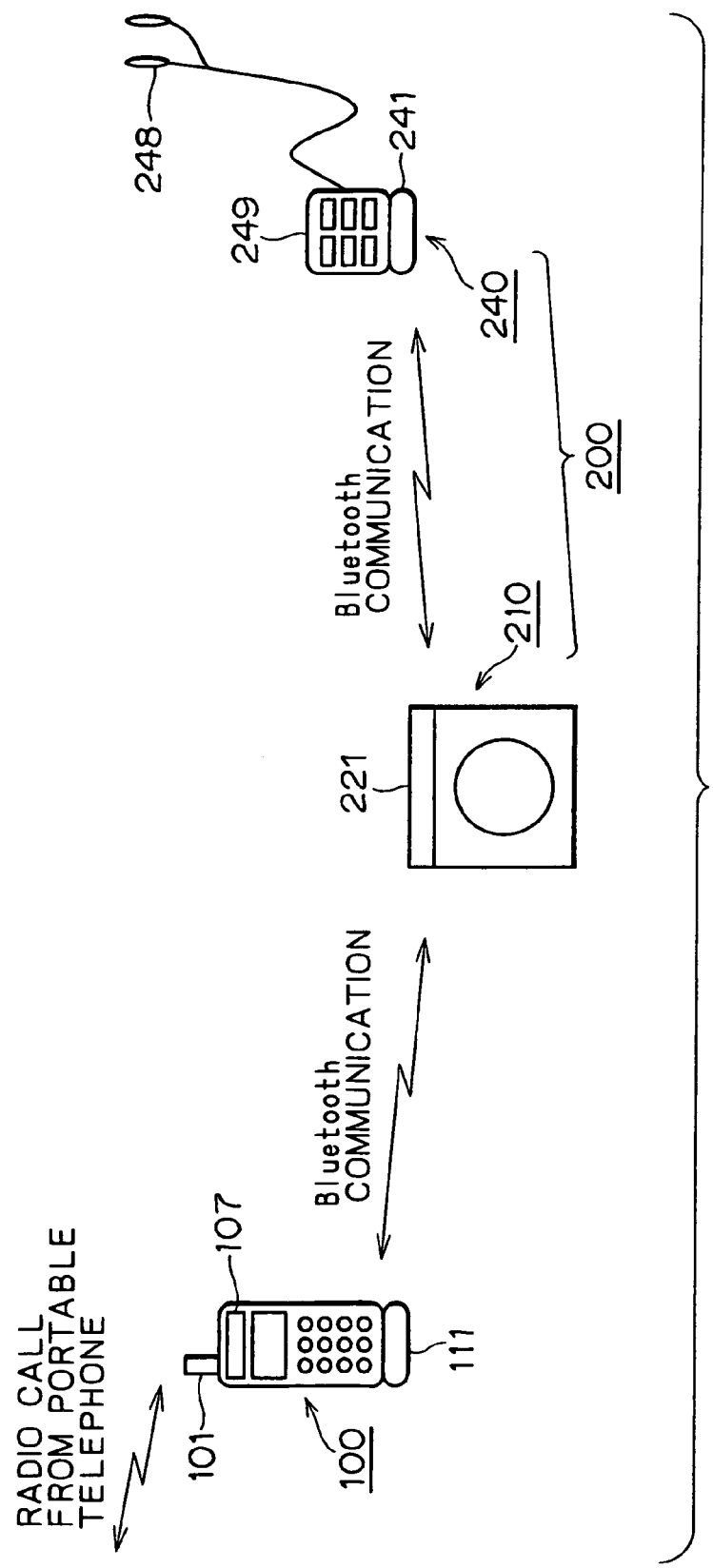
FIG. 1 is a block diagram showing the structure of an audio system where the present invention is applied.

The present invention is applied to an audio system of such a structure as shown in FIG. 1 for example.

The audio system shown in FIG. 1 is equipped with, as an audio device to be controlled by a telephone set 100 upon arrival of an incoming call, a portable CD player 200 which consists of a player unit 210 having a Bluetooth communication function and a headphone 240 with a remote control function.

Bluetooth (hereinafter referred to as BT) is a term of short-distance radio communication technology of which activity for standardization was started by five American, European and Japanese companies in May, 1998. According to this BT communication, its maximum data transfer rate is set to 1 Mbits/second (effectively, 721 kbits/second), and its maximum transmission distance is set to 10 meters. And a total of 79 channels each having a bandwidth of 1 MHz are allocated to an ISM (Industrial Scientific) band of 2.4 GHz available by users without license, wherein radio waves are transmitted by frequency-hopping spectrum spread technology in which channels are switched 1600 times per second. Devices adapted for such BT communication are separated into a master for determining a frequency hopping pattern and slaves opposite in communication. A master is capable of communicating with seven slaves simultaneously. A sub-net consisting of a maximum of eight devices including a master and slaves is termed a piconet. The slaves included in a piconet are permitted to serve as slaves in two or more piconets simultaneously.

The portable CD player 200 has antennas 221, 223 for BT radio communication in the CD player unit 210 and the remote-control headphone 240 respectively. In this portable CD player 200, music data reproduced by the CD player unit 210 are transmitted from the CD player unit 210 to the remote-control headphone 240. Meanwhile, when a remote control command button 249 attached to the remote-control headphone 240 is manipulated by the user, a corresponding control command is sent to the CD player unit 210.

Upon detection of an incoming call by a telephone antenna 101, the telephone set 100 emits a ringing tone from a speaker 107. This telephone set 100 is equipped also with a function to perform BT radio communication and has a BT antenna 111 for such communication.

In this embodiment where the telephone set 100 emits the same control signal as one transmitted from the remote-control headphone 240 to the CD player unit 210, relevant devices to be employed here are those conforming with the "Bluetooth" standards for radio communication. And "A/V protocol" is defined as one of transport layer protocols in the BT communication, and A/V device control commands are used for remote control.

Upon detection of an incoming call, the telephone set 100 interrupts the communication between the CD player unit 210 and the remote-control headphone 240. Then a command for temporarily pausing the reproduction is sent from the telephone set 100 to the CD player unit 210. And simultaneously with execution of such temporary pause of the reproduction in the CD player unit 210, the sound being emitted from the headphone 240 is brought to a stop. Consequently, the user is enabled to easily perceive the ringing tone outputted from his telephone set 100.

Figure 2:
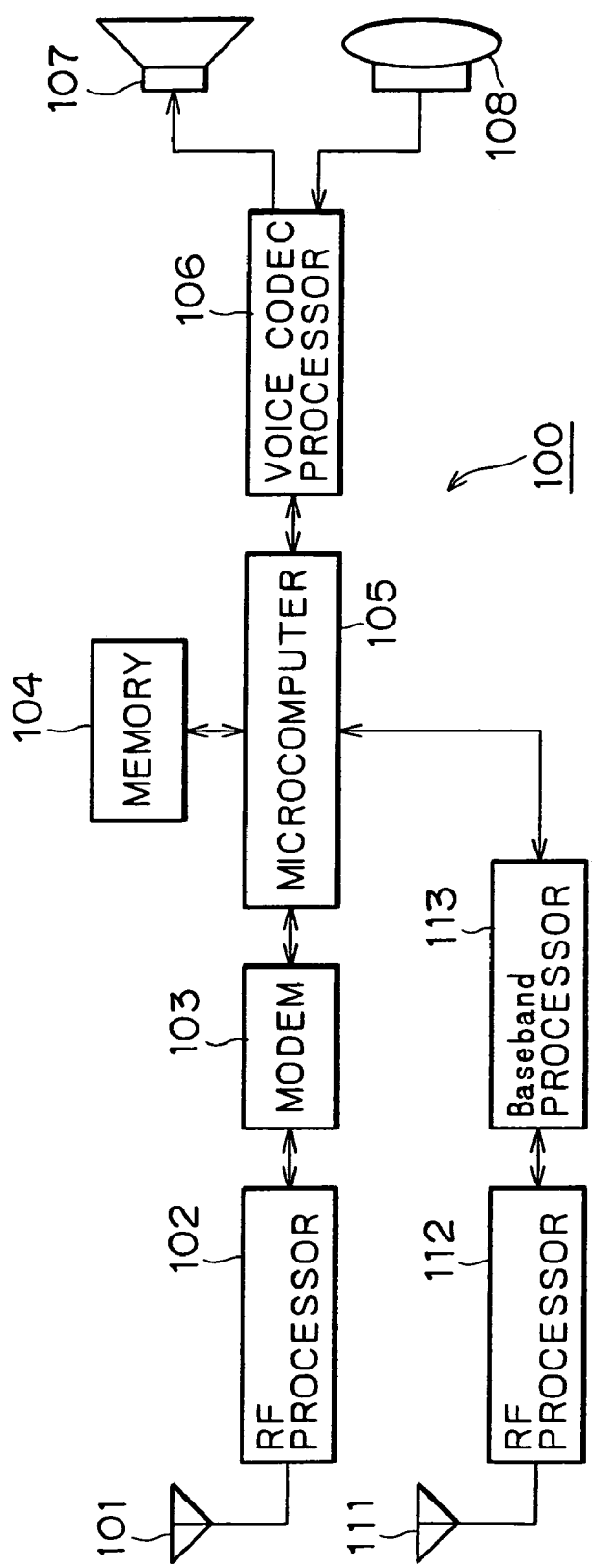
FIG. 2 is a block diagram showing the configuration of principal components in a telephone set employed in the above audio system.

FIG. 2 shows the configuration of principal components in the telephone set 100.

This telephone set 100 comprises a telephone antenna 101 for connection and communication with a public telephone network such as PHS or portable telephone, and a BT antenna 111 for BT communication. The telephone antenna 101 serves to transmit and receive radio waves of 1.9 GHz and 800 MHz-1.5 GHz. Meanwhile the BT antenna 111 serves to transmit and receive radio waves of a 2.4 GHz band.

A modem 103 is connected to the telephone antenna 101 via an RF processor 102, and a baseband processor 113 is connected to the BT antenna 111 via an RF processor 112. And a microcomputer 105 is connected to the modem 103 and the baseband processor 113.

A memory 104 and a voice codec processor 106 are connected to the microcomputer 105. Further, a speaker 107 and a microphone 108 are connected to the voice codec processor 106.

The RF processor 102 and the modem 103 demodulate the analog signal received by the telephone antenna 101, and then convert the received signal into digital data. Contrary thereto, the RF processor 102 and the modem 103 modulate digital data (voice data) to be transmitted into analog radio wave signal, and then transmit the same from the telephone antenna 101.

After processing the data received from the modem 103, the microcomputer 105 delivers the data to the voice codec processor 106. Subsequently in the voice codec processor 106, the voice converted into a communication format is returned to its former state and then is reproduced by the speaker 107. Meanwhile the voice inputted via the microphone 108 is converted into communication data by the voice codec processor 106 and, after being processed through the microcomputer 105, the modem 103 and the RF processor 102, the data are finally transmitted from the telephone antenna 101.

The microcomputer 105 further executes a process relative to a user interface of the telephone set 100, and also a process relative to BT communication. A program for operating the microcomputer 105 is stored previously in the memory 104. This memory 104 further stores data to be saved temporarily during the processing by the microcomputer 105.

Data transmitted by BT communication are commands for controlling the CD player unit 210 from the telephone set 100. These data are generated through processing by the microcomputer 105 and then are delivered to the baseband processor 113. Subsequently the baseband processor 113 converts the data, which have been delivered from the microcomputer 105, into a packet suited for BT communication. In this stage, a code for error correction and detection is added together with various data for communication. The data generated by the baseband processor 113 and delivered to the RF processor 112 are converted into analog data to be transmitted. The RF processor 112 modulates the delivered digital data and then sends the same as radio waves of a 2.4

GHz band from the BT antenna 111. The carrier frequency is selected by frequency hopping in a manner to be different per slot (group of data).

Meanwhile, received data include replies to the control commands sent from the telephone set 100 to the CD player unit 210 for example. These replies represent information signifying whether the command has been received properly, or whether desired control has been executed in response to the command. The signal received by the BT antenna 111 is demodulated and converted by the RF processor 112 into digital data, and then an error check and so forth are executed in the baseband processor 113. Thereafter the data are delivered to the microcomputer 105, where the relevant process is executed.

Figure 3:
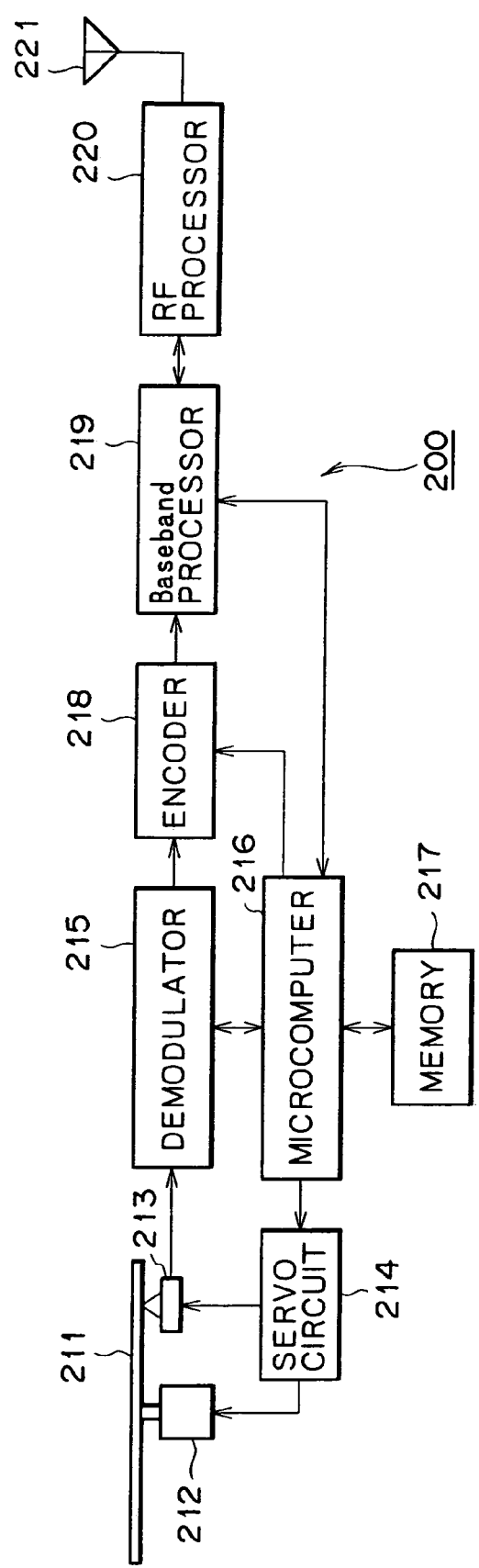
FIG. 3 is a block diagram showing the configuration of principal components in a CD player unit of a portable CD player in the above audio system.

FIG. 3 shows the configuration of principal components of the CD player unit 210 in the portable CD player 200.

The CD player unit 210 comprises a spindle motor 212 for rotating a compact disc (CD) 211; a pickup 213 for optically reading out signals from the CD 211; a servo circuit 214 connected to the spindle motor 212 and the pickup 213; a demodulator 215 connected to the pickup 213; a microcomputer 216 connected to the demodulator 215; a baseband processor 219 connected to the demodulator 215 via an encoder 218; and a BT antenna 221 connected to the baseband processor 219 via an RF processor 220.

In the CD player unit 210, the spindle motor 212 rotates the CD 211 under control of the servo circuit 214. At this time, the pickup 213 reads out the signals from the CD 211 and then supplies the same to the demodulator 215. Subsequently the demodulator 215 converts the signals, which have been read out by the pickup 213, into digital data with execution of error correction, thereby reproducing the original music data.

In the CD player unit 210, the data reproduced by the demodulator 215 are supplied further to the encoder 218 so as to send the music data to the remote-control headphone 240 by BT radio communication. Then the encoder 218 converts the input music data into a format (MP3, ADPCM, ATRAC, etc.) specified by the BT A/V protocol. And the data thus converted are transmitted finally from the BT antenna 221 via the baseband processor 219 and the RF processor 220.

The microcomputer 216 sends various control commands to the peripheral processing blocks or receives therefrom the information relative to the state. The microcomputer 216 further processes the user interface in the CD player unit 210 and the control commands from the remote-control headphone 240. The control command from the remote-control headphone 240 is received by the BT antenna 221 and then is interpreted in the microcomputer 216 via the RF processor 220 and the baseband processor 219.

A program prepared for operating the microcomputer 216 is described in a memory 217 connected to the microcomputer 216. Other memories used temporarily for the processing in the microcomputer 216 are also included in this memory 217.

Figure 4:
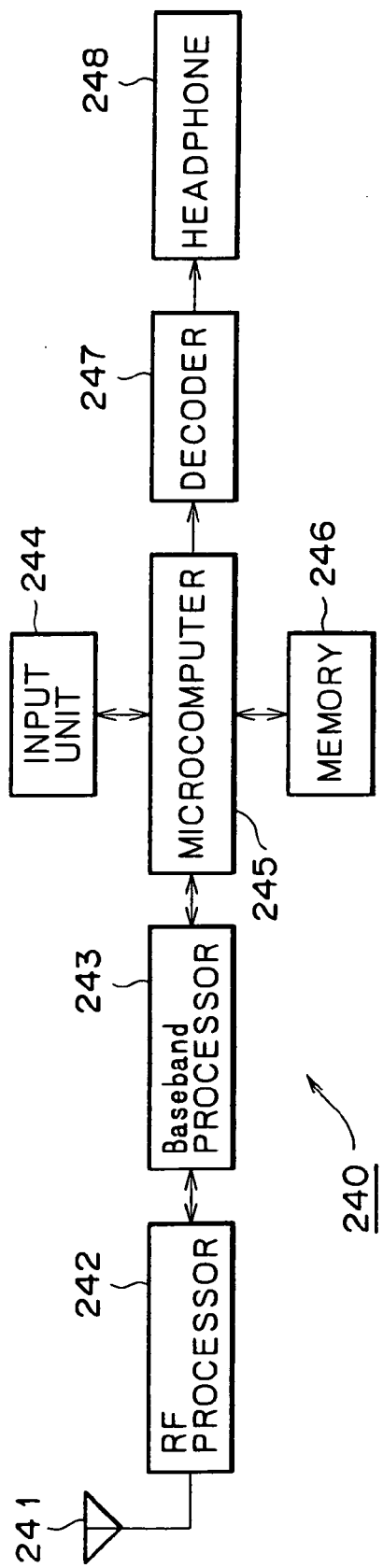
FIG. 4 is a block diagram showing the configuration of principal components in a remote-control headphone belonging to the CD player unit.

FIG. 4 shows the configuration of principal components in the remote-control headphone 240 belonging to the CD player unit 210.

The remote-control headphone 240 is equipped with a BT antenna 241 for BT communication. A baseband processor 243 is connected to the BT antenna 241 via an RF processor 242. And a microcomputer 245 is connected to the baseband processor 243.

An input unit 244, a memory 246 and a decoder 247 are connected to the microcomputer 245. And a headphone 248 is connected to the decoder 247.

In the remote-control headphone 240, the BT antenna 241 receives music data transmitted from the CD player unit 210. The music data are demodulated by the RF processor 242 and, after conversion thereof into digital data, an error check and so forth are executed by the baseband processor 243. Subsequently the microcomputer 245 unifies the packets divided for transmission, and reproduces the data outputted from the encoder 218 of the CD player unit 210. Then the decoder 247 restores the same to the original music data and emits the sound thereof from the headphone 248.

Meanwhile, when the user manipulates a command button 249 of the remote controller, the input unit 244 detects it and notifies the microcomputer 245 of such manipulation. Then the microcomputer 245 interprets it as a command, and generates command data in accordance with the BT A/V protocol. Subsequently the command data thus generated are transmitted from the BT antenna 241 via the baseband processor 243 and the RF processor 242.

A program prepared for operating the microcomputer 245 is described in a memory 246 connected to the microcomputer 245. Other memories used temporarily for the processing in the microcomputer 245 are also included in this memory 246.

Figure 5:
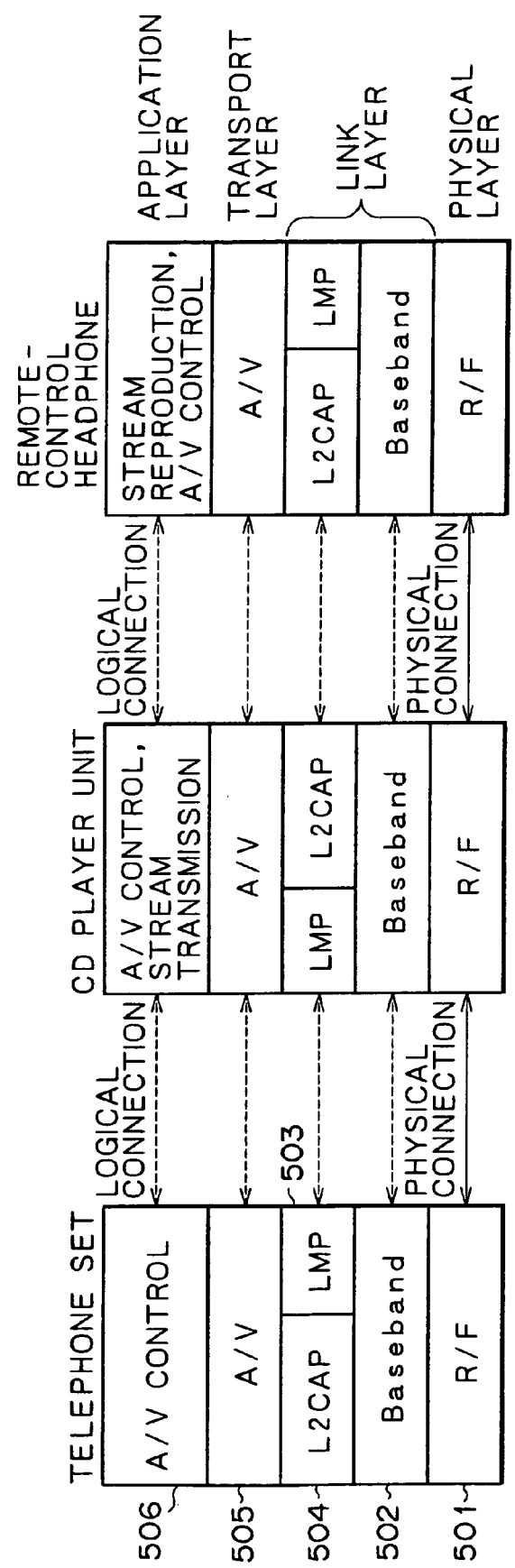
FIG. 5 is a diagram typically showing a protocol stack for execution of communication by BT-adapted devices.

Next, FIG. 5 shows a protocol stack for executing communication by each BT-adapted device.

In a physical layer (R/F 501), digital data are converted into analog data and then are transmitted from the antenna. Primary modulation thereof is performed in accordance with the sequence of 0, 1 of the digital data, and the modulated data are transmitted through superposition on a 2.4 GHz-band carrier. The carrier is switched continuously by frequency hopping which changes the carrier frequency per data transmission (slot).

Transmission and reception of data are performed alternately per slot. In a reception slot, the 2.4 GHz-band carrier is removed from the signal received by the antenna, and then demodulation thereof is performed to extract the digital data having the sequence of 0, 1. Although the frequency of the carrier to be removed is continuously changed by frequency hopping, the hopping sequence relative to each opposite device in communication is known previously.

A main role of a link layer (Baseband 502) is to control retransmission of the data.

A variety of communication information are additionally attached to the original data before transmission to the opposite device in communication. Upon reception of the data, a reply is sent back as to whether the data have been received properly or not. In the case of failure in proper reception, a request for retransmission of the data is sent. And if the opposite device fails to receive the data even with repeated transmission thereof, the transmission is given up after a predetermined number of times. In the case of overflow of the receiving buffer, a temporary pause of the transmission is requested to the opposite device.

In addition to such information relative to communication control, some other codes for error detection and correction are also attached to the data for enhancing the performance against any error that may be caused in the communication channel.

A link layer (LMP (Link Management Protocol) 503) is used for controlling the link state to a destination connected in BT communication, including the following items.

Establishment and release of connected state

Mode control according to presence or absence of data to be transmitted or received, and communication frequency Switching of kinds of packets according to state of communication channel Authentication for permitting data communication Encryption in data communication In a link layer (L2CAP (Logical Link Control & Adaptation Protocol) 504), logical channels are defined. Two BT communication devices are physically linked through a single communication channel, and a plurality of logical channels can be defined here. Consequently, it becomes possible to realize simultaneous transmission and reception of the data of various high-order protocols. And when the data size delivered from the high-order protocol is great, the data are subdivided into packets defined in the Baseband 502. The data are subdivided on the transmitting side, and such data are restructured to the former great cluster on the receiving side.

The processing executed in the link layer L2CAP 504 includes interchange of information with the opposite device in BT communication, relative to the data transfer rate and the response speed to the transmission.

In a transport layer (A/V protocol 505), there are prescribed music data in BT communication, transmission and reception of video data, and commands for controlling an A/V device, and an A/V protocol packet is generated as shown in FIG. 6, where destination ID, source ID, response/command, contents of command, and control command information composed of CH, NO and so forth are subdivided for transmission and are contained in a payload area of the baseband packet in BT communication. With regard to music and video data, a format is determined inclusive of the kinds of data (MP3, ATRAC, MPEG4) to be transferred as a stream, quality (transfer rate, compression ratio) and so forth, and a data packet is generated as shown in FIG. 7, where the format and the data are contained in a payload area of the baseband packet in BT communication. As for control commands, there are defined those relevant to controlling the states of the A/V device, such as reproduction, stop, temporary pause, fast-forward and so forth.

In an application layer (506) above the transport layer (A/V protocol 505), a program is described with regard to the operation performed actually in each device. This portion is different depending on the individual device.

According to the telephone set 100 in this embodiment where the A/V device is remote-controlled, the peripheral A/V device is brought to a stop upon arrival of an incoming call, so that the user of the A/V device is notified of the incoming call.

The CD player unit 210 transmits the reproduced music to the remote-control headphone 240, and further functions to pause or mute the CD player in response to a control command from the remote-control headphone 240 or the telephone set 100.

The remote-control headphone 240 reproduces the music received from the CD player unit 210, and further transmits, as an A/V control command, the result of manipulation of the command button 249 by the user, to the CD player unit 210.

Figure 8:
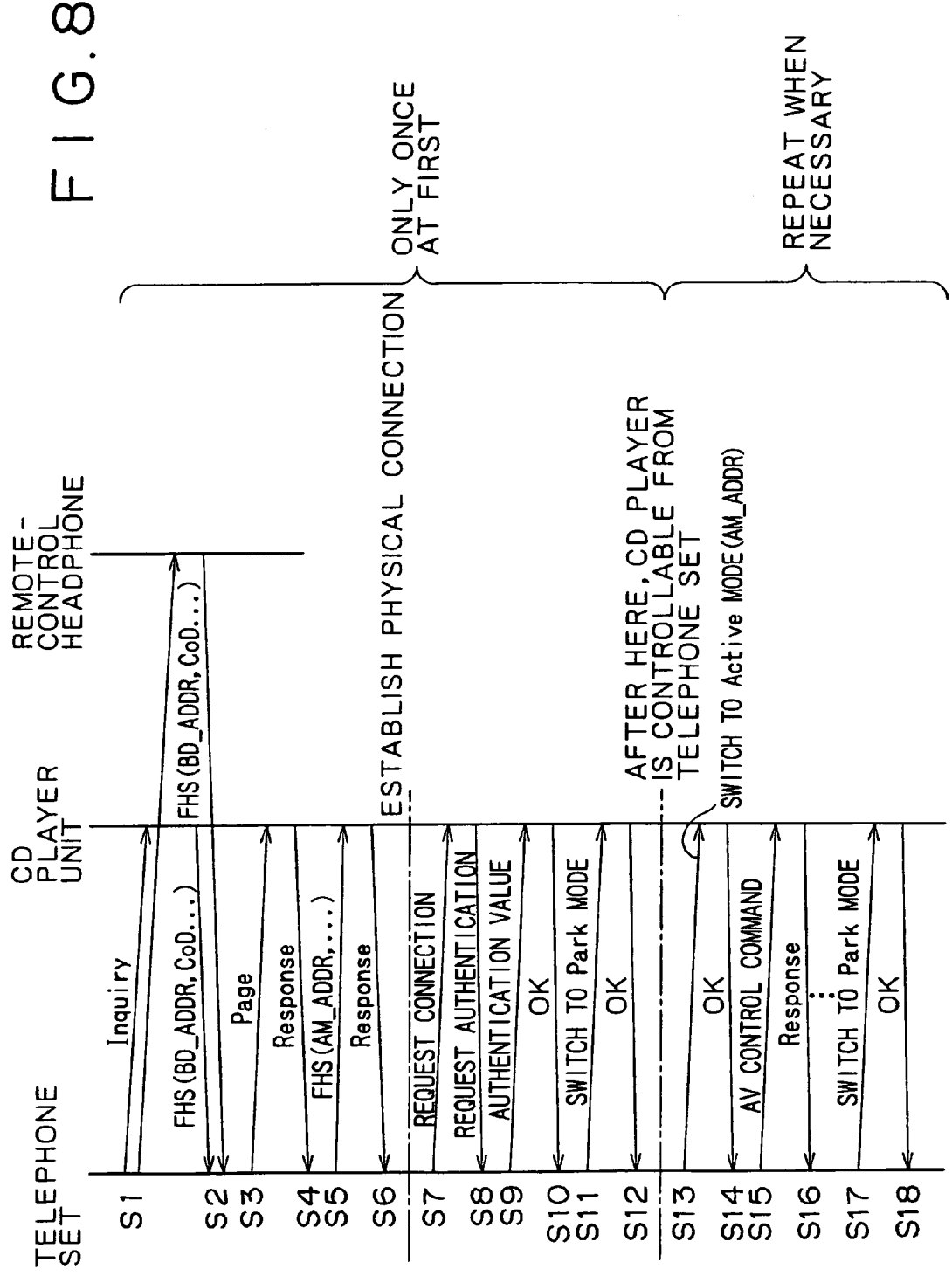
FIG. 8 is a diagram typically showing the procedure of communication between a telephone set and a portable CD player based on a BT protocol.

FIG. 8 shows a flowchart of communication executed between the telephone set 100 and the portable CD player 200 in conformity with the BT protocol. This routine is separated into the first half for establishing a link and enabling data communication, and the latter half for sending a remote control signal from the telephone set 100 to the CD player unit 210.

First, the telephone set 100 sends an inquiry message and acquires information of the peripheral devices (S1).

The device having received the inquiry message makes a reply with an FHS packet (S2).

Figure 9:
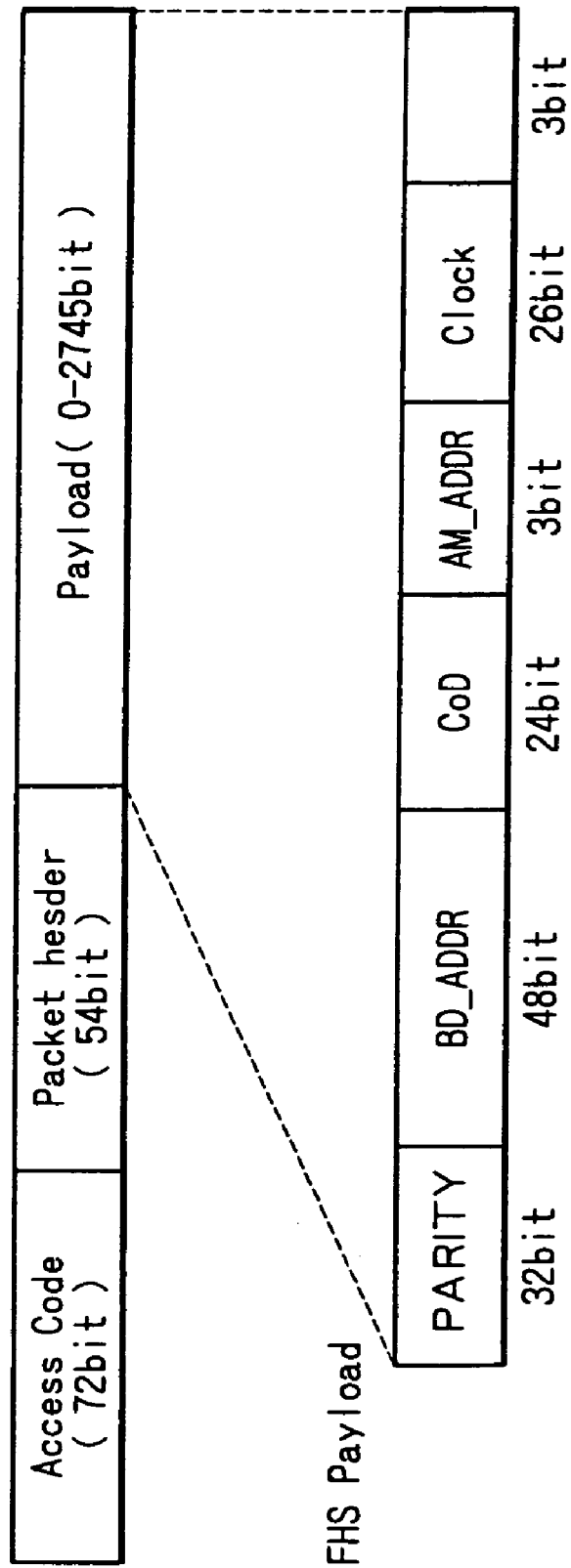
FIG. 9 is a diagram typically showing the composition of an FHS packet.

As shown in FIG. 9, the FHS packet contains BD_ADDR (Bluetooth Device Address) and CoD (Class of Device). BD_ADDR is 48-bit ID assigned to the relevant device. A unique code is assigned solely to each device. CoD represents the class of the relevant device. Such information is used for identifying the telephone set 100, the CD player unit 210, the headphone 240 and so forth.

When the telephone set has completely acquired the information of the peripheral devices, a link is established to the target device to be controlled (i.e., CD player unit 210 in this example).

A step to be executed first is transmission of a page message (S3). The page message includes BD_ADDR of the target device to be connected.

Upon reception of the page message, the device specified by BD_ADDR, i.e., the CD player unit 210, sends back a response therefrom (S5).

When the telephone set 100 has received the response from the CD player unit 210, the telephone set 100 transmits information which is contained in an FHS packet and relates to participation of the CD player unit 210 in a piconet where the telephone set 100 serves as a master (S5). "Piconet" is a term employed in BT communication, and it signifies a star type network formed with one central master device. Any other device than the master is called a slave. The FHS packet contains intra-piconet ID assigned by the master telephone set 100 to the slave CD player unit 210. This ID corresponds to AM_ADDR (Active Member Address), and a maximum of seven (from 1 to 7) ID are assigned within one piconet. The FHS packet further contains some other information including the frequency hopping sequence of the master and the clock phase thereof. In subsequent data communication, the CD player unit 210 uses such frequency hopping and clock information notified by the FHS packet.

Due to the processing mentioned above, coincidence is attained between the telephone set 100 and the CD player unit 210 with regard to the frequency hopping sequence and the clock phase, thereby achieving a physically communicable state. Such a state ready for communication with assignment of AM_ADDR is termed an active mode.

Next, a connection request for actually controlling the CD player unit 210 is sent from the telephone set 100 (S7).

The CD player unit 210 sends an authentication request for permitting control from only the known telephone set 100 (e.g., of the user of the CD player) notified previously (S8).

In the authentication, the telephone set 100 sends an obtained authentication value based on a password preset between the telephone set 100 and the CD player unit 210 (S9).

In BT, PIN (Personal Identification Number) corresponds to this password.

Upon success of the authentication procedure, the CD player unit 210 notifies the telephone set 100 of such a result (S10).

Subsequently, it becomes actually possible to control the CD player unit 210 from the telephone set 100.

In this embodiment, however, control of the CD player unit 210 by the telephone set 100 is executed only at the time of an incoming call. Then, BT communication of the CD player unit 210 to the telephone set 100 is placed in a park mode (S11, S12).

In the park mode, the CD player unit 210 is disconnected from the piconet where the telephone set 100 serves as a master, and AM_ADDR assigned thereto is released. The frequency hopping sequence and the clock phase are still left in synchronism with the intra-piconet communication so as to be readily returned to the piconet later.

When it becomes necessary to control the CD player unit 210 from the telephone set 100 upon arrival of an incoming call, BT communication of the CD player unit 210 to the telephone set 100 is returned from the park mode to the active mode (S13, S14). In this case, AM_ADDR unused in the piconet with the telephone set 100 serving as a master is assigned to the CD player unit 210.

Subsequently, transmission of the A/V control command from the telephone set 100 (S15) and reception of the response from the CD player unit 210 (S16) are executed repeatedly and, after termination thereof, the CD player unit 210 is placed in the park mode again (S17, S18).

Next, the communication procedure carried out among three BT communication devices will be described below with reference to FIG. 10 which shows a flowchart of communication executed among the three BT communication devices, i.e., the telephone set 100, the CD player unit 210 and the remote-control headphone 240.

Figure 11:
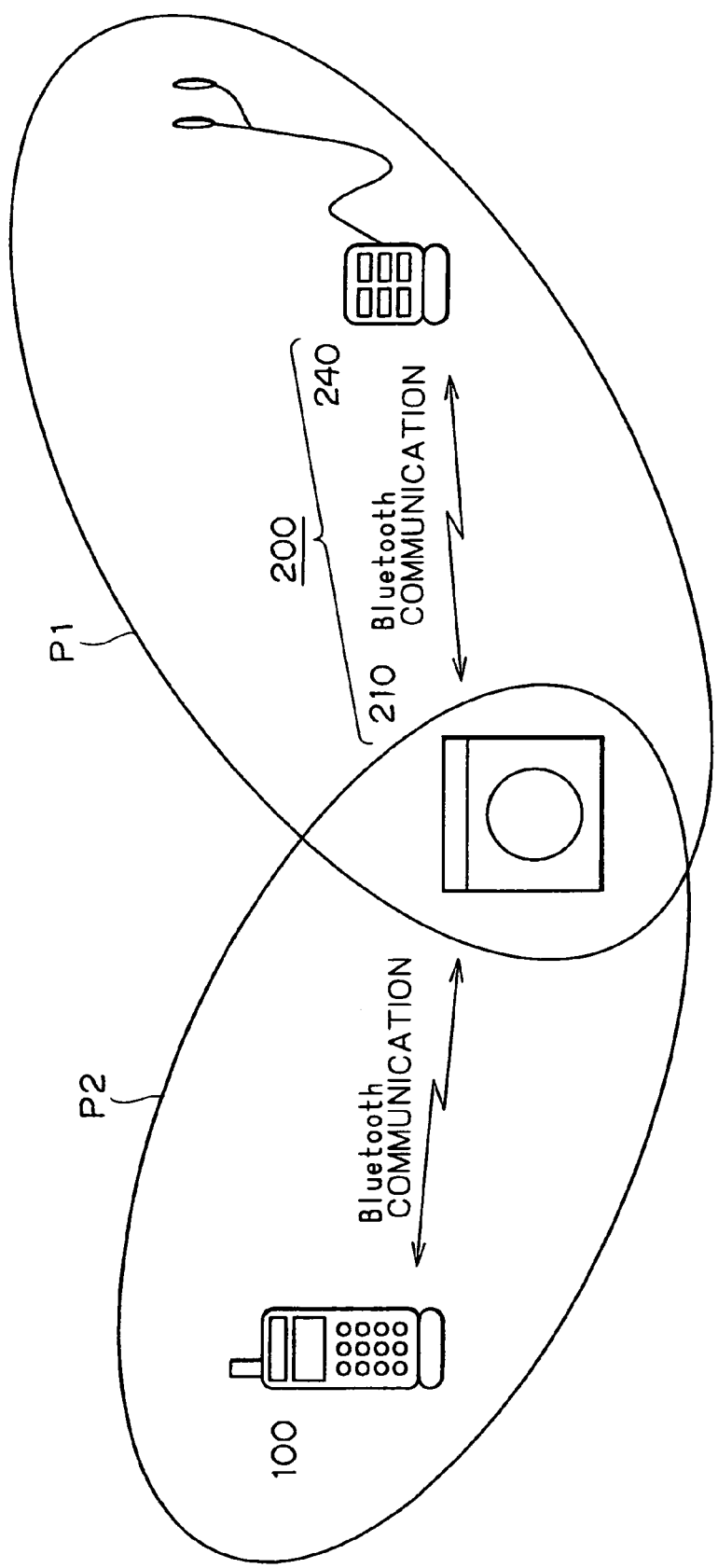
FIG. 11 is a diagram typically showing the state of a piconet in communication among the three BT communication devices in FIG. 10.

It is premised here that, as shown in FIG. 11, two piconets P1 and P2 are existent among the three devices, and the CD player unit 210 belongs to both of such piconets. In BT communication, a group of piconets where some devices are partially duplicate is termed a scatter-net. One is a piconet P1 where the CD player unit 210 serves as a master, while the remote-control headphone 240 serves as a slave. Its fundamental operation is to transmit music data from the CD player 210 to the remote-control headphone 240. In case the user has manipulated the remote controller, an A/V control command is sent from the remote-control headphone 240 to the CD player unit 210. The other is a piconet P2 where the telephone set 100 serves as a master, while the CD player unit 210 serves as a slave.

As shown in the communication flowchart of FIG. 8, the CD player unit 210 in the piconet P2 is placed basically in the park mode. And only when it becomes necessary, upon arrival of an incoming call, to stop the CD player unit 210 by manipulating the remote controller from the telephone set 100, the CD player unit 210 is switched to the active mode to perform transmission and reception of data.

Placing the CD player unit 210 in the park mode relates merely to BT communication with the telephone set 100, and it is different in regard to BT communication with the remote-control headphone 240.

First, the CD player unit 210 is transmitting music data to the remote-control headphone 240 (S21).

If an incoming call arrives during such transmission, the telephone set 100 switches the CD player unit 210 from the park mode to the active mode (S22, S23).

Then a pause command is sent (S24).

The CD player unit 210 executes its operation in compliance with the command, and notifies the result thereof (S25). At this point of time, transmission of data from the CD player unit 210 to the headphone 240 is brought to a stop.

Thereafter the telephone set 100 switches the CD player unit 210 to the park mode again (S26, S27).

When the CD player unit 210 held in its pause is to be placed in a playing state for reproduction, the user manipulates the remote-control headphone 240. Then a play command is sent to the CD player unit 210 (S28). And upon start of play (S29), transmission of the music data is resumed from the CD player unit 210 to the remote-control headphone 240 (S30).

As described above, arrival of an incoming call is rendered noticeable by utilizing the telephone set 100 and the A/V device equipped with a function of BT communication. When it is possible to transmit, from the telephone set 100, a command for controlling the A/V device, the playing operation of the peripheral audio device can be paused upon arrival of an incoming call, thereby enabling the user to easily perceive the ringing of the telephone set 100.

Further, in case an A/V stream can be transmitted from the telephone set, the ringing tone emitted upon arrival of an incoming call may be sent to the speaker or headphone of the peripheral A/V device to thereby realize an incoming-call notice function.

The arrangement may be so modified that, when an incoming call has arrived at the user's home telephone set for example, a ringing tone is emitted from the speaker of a stereo apparatus installed in some other place than the room with the telephone set. In this case, it is supposed that all the telephone set, the stereo apparatus and the speaker are adapted for BT communication. The telephone set transmits a ringing tone to the speaker after pause of music reproduction in the stereo apparatus by a manipulation of its remote controller. In this manner, it becomes possible for the user to perceive arrival of an incoming call from a separate room without the necessity of increasing the ringing tone volume in the telephone set.

The above-described advantage is achievable also by combining the telephone set 100, the CD player unit 210 and the remote-control headphone 240 explained in regard to the embodiment. Upon arrival of an incoming call, reproduction of music in the CD player unit 210 is first brought to a stop by remote control from the telephone set 100, and then a ringing tone is transmitted to the headphone 240. As a result, even if the ringing tone of the telephone set 100 is kept in an off-state, the user with the headphone 240 is enabled to perceive arrival of an incoming call.

According to the result of the inquiry (S2) made in the communication flow of FIG. 8 mentioned above, the target device to be controlled from the telephone set 100 is merely one CD player unit 210 alone.

In case there are a plurality of target devices to be controlled from the telephone set 100 and the entire devices need to be controlled upon arrival of an incoming call, the processes from S3 to S12 are executed, after reception of the result of the inquiry (S2), with regard to each target device to be controlled. And upon arrival of an incoming call, the processes from S13 to S18 are executed with regard to each target device to be controlled.

In the communication flow of FIG. 8, if the telephone set 100 previously knows, from the beginning, the information of the opposite device to be connected, then the process of searching the device can be omitted. That is, the communication at steps S1 and S2 is omissible.

It is also possible to contrive such use that the CD player unit 210 accepts control from the entire devices without authentication. In this case, steps S8 and S9 are skipped.

Figure 12:
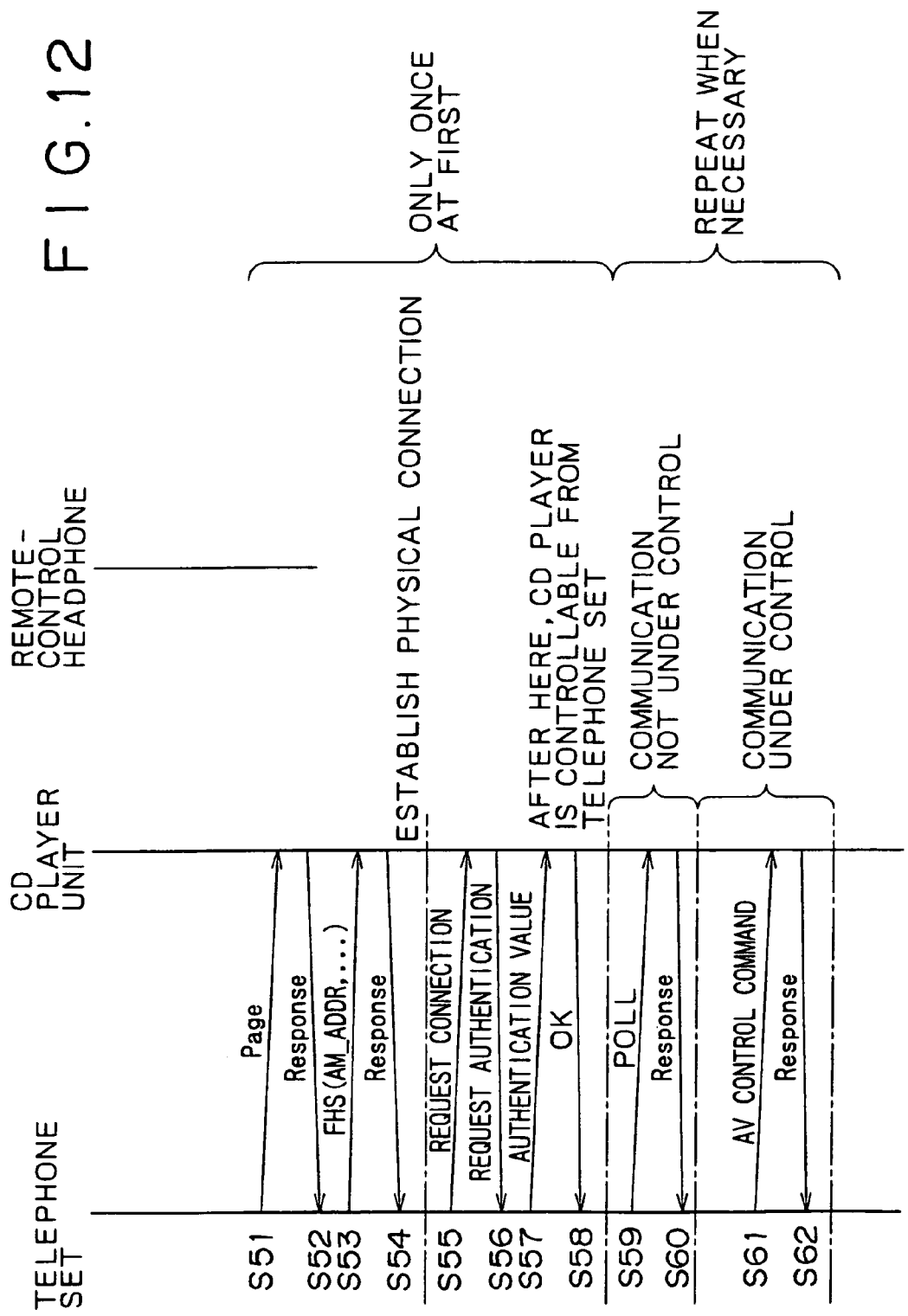
FIG. 12 is a diagram typically showing the other procedure of communication between the telephone set and the portable CD player based on the BT protocol.

It is further possible to omit the process of switching the connection between the telephone set 100 and the CD player unit 210 to the park mode. FIG. 12 shows a flowchart of communication in this case. It is premised here that the telephone set 100 previously knows BD_ADDR, CoD and so forth of the CD player unit 210. For establishing a link with the CD player unit 210, the telephone set 100 starts its operation from issue of a page command (S51).

Upon reception of such a page command, the CD player unit 210 returns a response (S52).

Then, the telephone set 100 having received the response sends to the CD player unit 210 an FHS packet which contains the information of AM_ADDR, frequency hopping sequence, clock phase and so forth, thereby notifying the CD player unit 210 of such information (S53).

After the CD player unit 210 having received the FHS packet returns a response (S54), a physical link is established between the telephone set 100 and the CD player unit 210, so that BT communication is rendered possible.

Next, a request for logical connection is sent to enable actual control of the CD player unit 210 from the telephone set 100 (S55).

Subsequently, the CD player unit 210 returns a request for authentication to the telephone set (S56), so as to prevent non-permitted control from any unspecified device.

In reply to the authentication request, the telephone set 100 sends an authentication value calculated with regard to the CD player unit 210 (S57), and then the CD player unit 210 executes authentication in accordance with the received value.

Upon success of the procedure for authentication, the CD player unit 210 notifies the telephone set 100 of the result (S58).

After the above process, actual control of the CD player unit 210 from the telephone set 100 is rendered possible.

In this embodiment, however, such control of the CD player unit 210 from the telephone set 100 is performed merely at the time of arrival of an incoming call. In any other case, a POLL packet is sent periodically from the telephone set 100 to the CD player unit 210 (S59). The CD player unit 210 having received a POLL packet returns a response (S60).

The POLL packet is used when the master device (telephone set 100 in this example) executes a check as to whether the slave device (CD player unit 210 in this example) is within a communicable area or not.

In case the telephone set 100 controls the CD player unit 210, there are executed transmission of an AV control command (S61) and reception of a command response (S62).

In the communication flow of FIG. 12, as described above, a BT link is previously established between the telephone set 100 and the CD player 210, and upon arrival of an incoming call, the CD player unit 210 is controlled from the telephone set 100.

Differing from the above, there may be contrived another method which establishes a BT link between the telephone set 100 and the CD player unit 210 upon arrival of an incoming call, and disconnecting the link after control of the CD player unit 210 from the telephone set 100.

Figure 13:
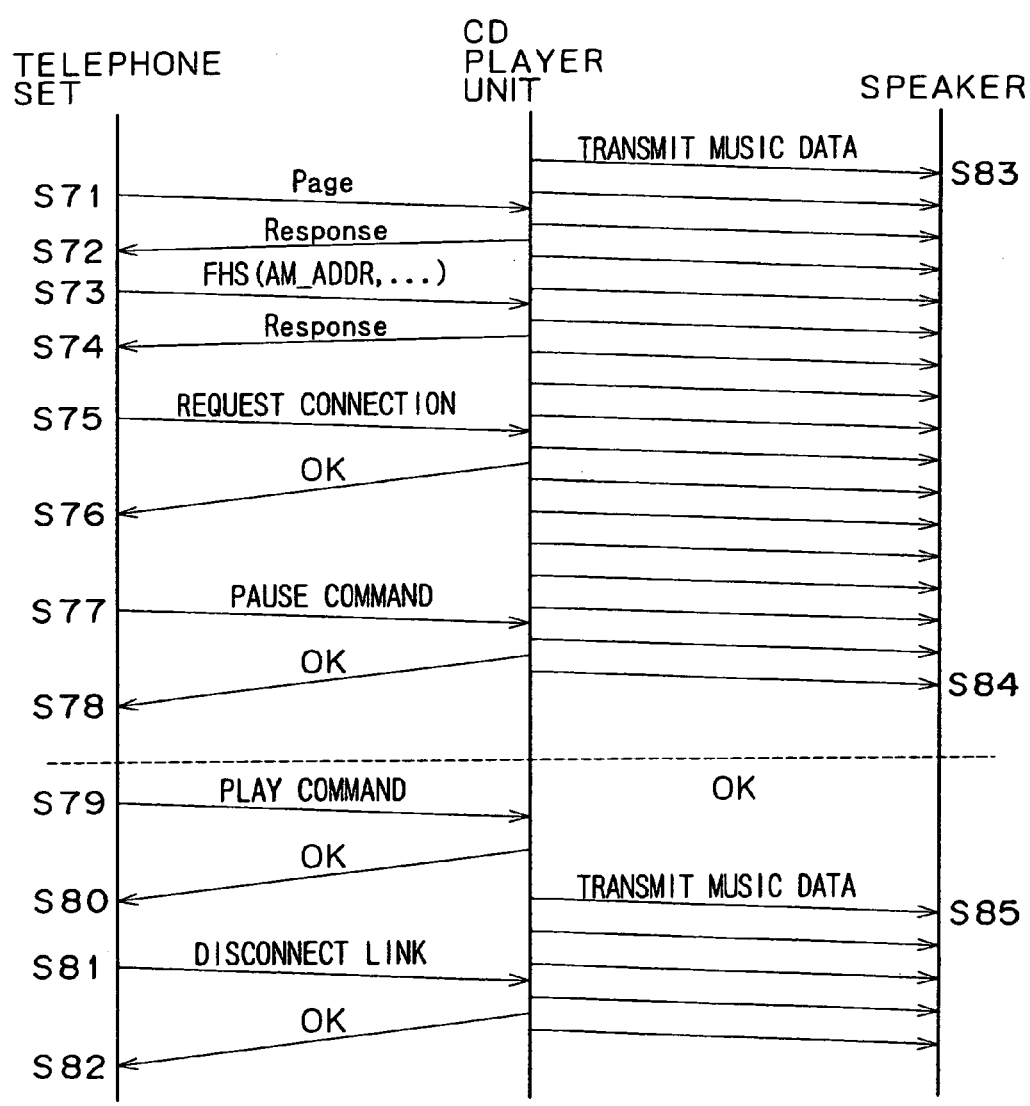
FIG. 13 is a diagram typically showing the other procedure of communication among three BT communication devices.

FIG. 13 shows a communication flow in such a case.

At first, the CD player unit 210 is transmitting music data to the speaker (S83).

If an incoming call arrives during the above transmission, the telephone set 100 sends a page command to the CD player unit 210 (S71). After this step, the communication between the telephone set 100 and the CD player unit 210 is executed in the interval of the communication between the CD player unit 210 and the speaker.

The CD player unit 210 having received the page command returns a response (S72).

Then, the telephone set 100 having received the response sends an FHS packet to the CD player unit 210, thereby notifying it of the information inclusive of AM_ADDR, frequency hopping sequence, clock phase and so forth (S73).

After the CD player unit 210 having received the FHS packet returns a response (S74), a physical link is established between the telephone set 100 and the CD player unit 210, whereby BT communication is rendered possible.

Subsequently, a request for logical connection is sent to enable actual control of the CD player unit 210 from the telephone set 100 (S75).

When necessary, if the CD player unit 210 permits connection with the telephone set 100 after termination of the authentication procedure, the telephone set 100 is notified of the result (S76).

After this step, control of the CD player unit 210 from the telephone set 100 is rendered actually possible.

Then the telephone set 100 sends a pause command to the CD player unit 210 (S77).

The CD player unit 210 having received the command returns a response (S78), and stops its playing operation temporarily (S84).

In this situation, the user is enabled to perceive the ringing tone of the telephone set 100 and can therefore answer the call. In this embodiment, the connection between the telephone set 100 and the CD player unit 210 is continuously maintained during such period of time.

When the user has hung up the telephone set 100, the telephone set 100 sends a play command to the CD player unit 210 (S79).

Upon reception of this command, the CD player unit 210 returns a response (S78), and then resumes its playing operation (S85).

In reply to this response, the telephone set 100 sends a request for disconnecting the link with the CD player unit 210 (S81), and thus the entire processing routine is completed at the time of receiving the OK response (S82).

Figure 10:
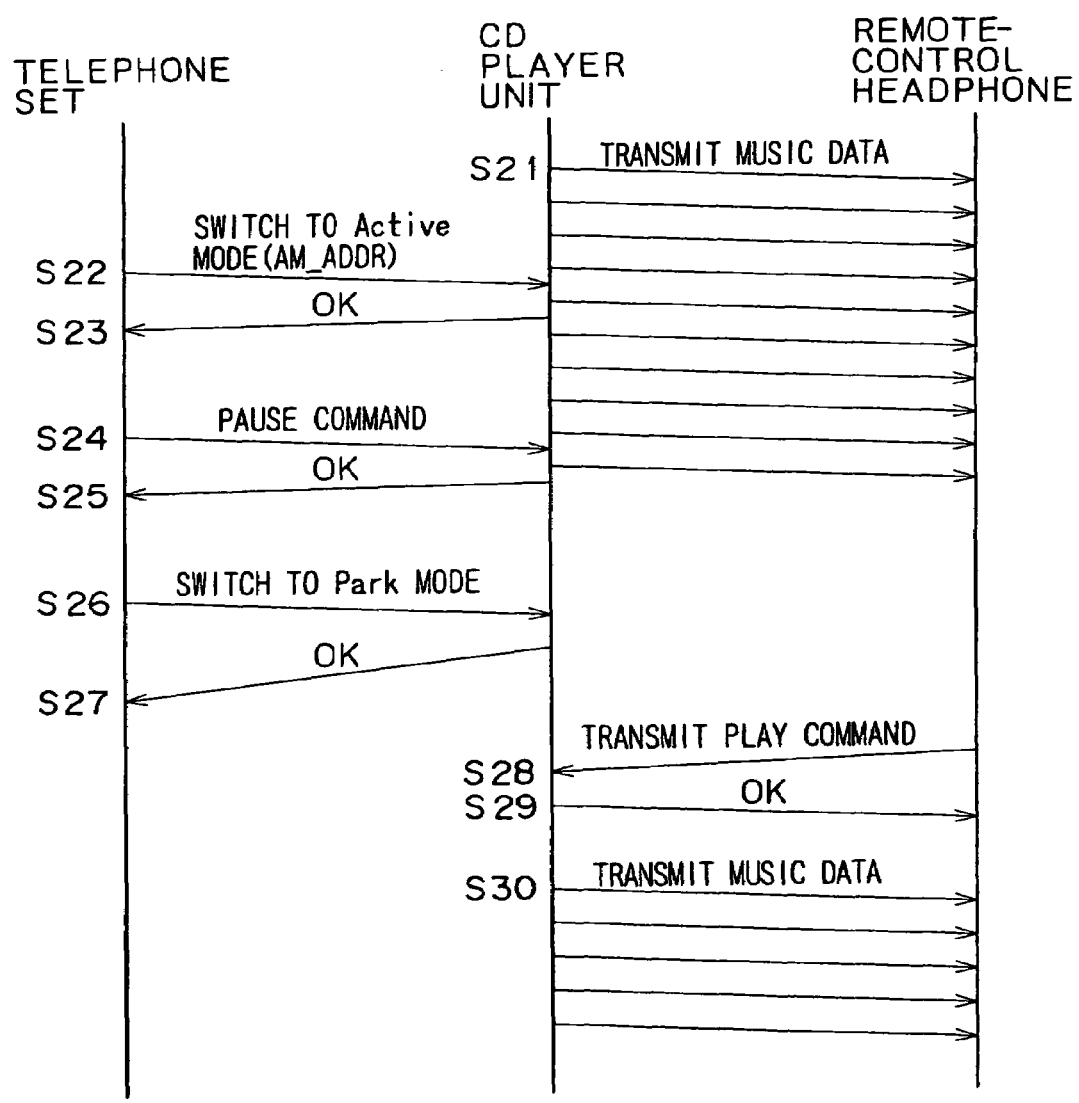
FIG. 10 is a diagram typically showing the procedure of communication among three BT communication devices.

In the aforementioned communication flow shown in FIG. 10, pausing the playing operation of the CD player unit 210 is performed from the telephone set 100, while resuming the playing operation thereof is performed from the remote-control headphone 240. However, as in the communication flow of FIG. 13, it is also possible to control both pause and resumption of the operation of the CD player unit 210 from the telephone set 100.

Further in the communication flow of FIG. 13, the telephone set 100 merely pauses the playing operation of the CD player unit 210 upon arrival of an incoming call. However, the configuration may be so modified that, in addition thereto, the telephone set 100 also sends a ringing tone to the speaker.

Figure 14:
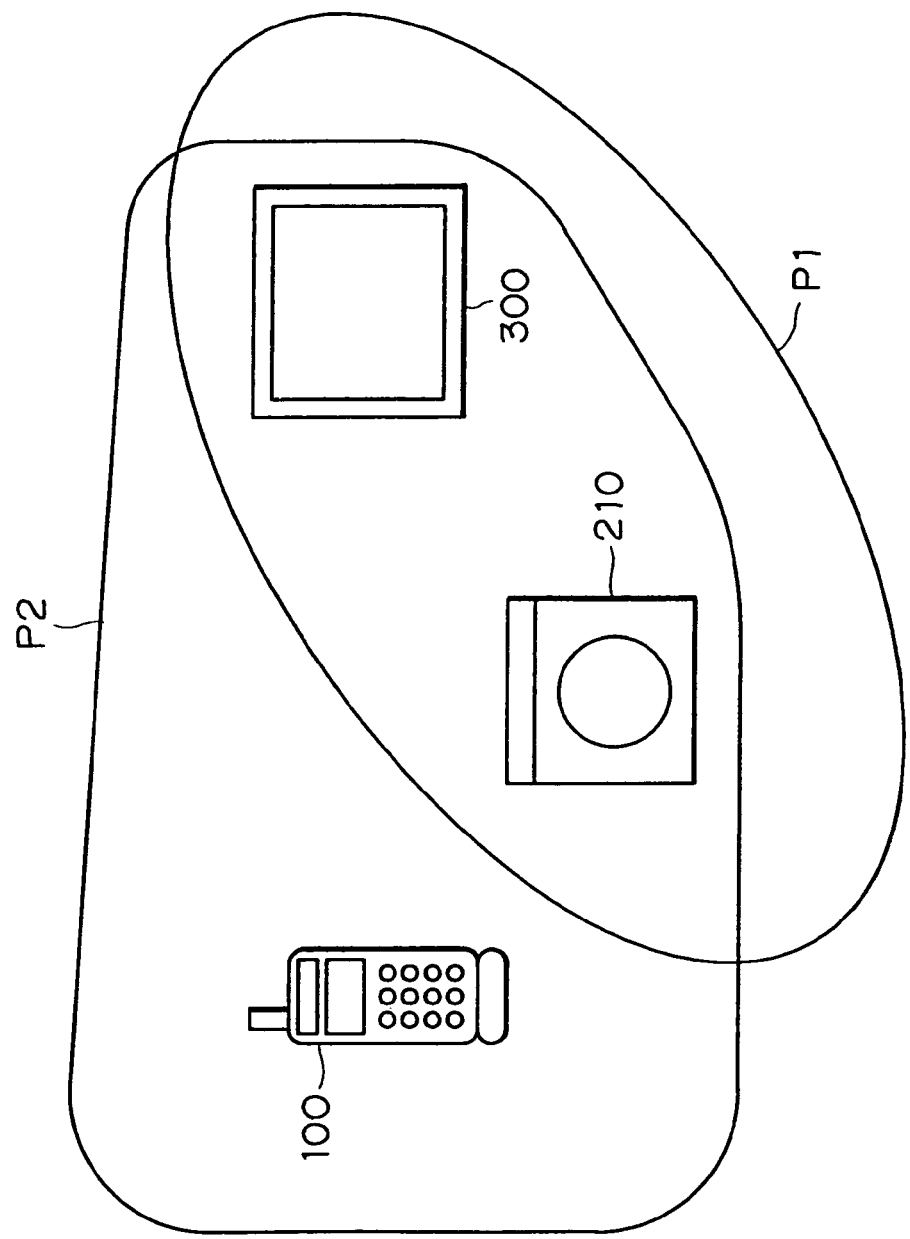
FIG. 14 is a diagram typically showing the state of a piconet in communication among the three BT communication devices in FIG. 13.

In this case, the connection between the devices is such as shown in FIG. 14, wherein two piconets constitute the system.

One is a piconet where the CD player unit 210 serves as a master, while the speaker 300 serves as a slave. And the other is a piconet where the telephone set 100 serves a master, while the CD player unit 210 and the speaker 300 serve as two slaves.

The speaker 300 is capable of receiving audio data from both of the telephone set 100 and the CD player unit 210, and reproduces the received data.

The CD player unit 210 is controllable from the telephone set 100 and, in case a control command is sent from the telephone set 100, performs its operation in compliance with the command.

Figure 15:
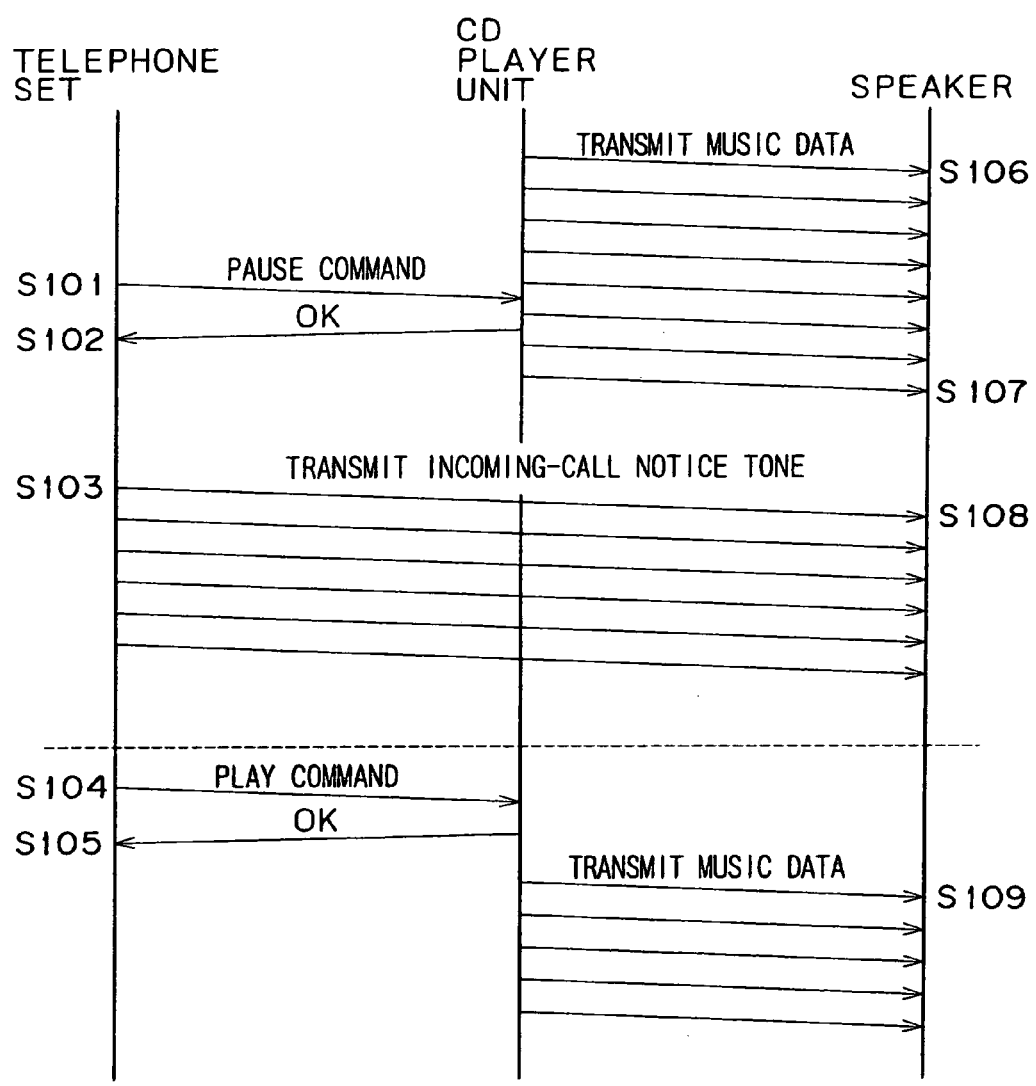
FIG. 15 is a diagram typically showing another procedures of communication among three BT communication devices.

It is supposed here that the connection between the devices in the above piconet is formed in advance through the processes at steps S1 to S10 in the processing flow of FIG. 8. FIG. 15 shows the operation performed upon arrival of an incoming call.

At first, the CD player unit 210 is transmitting music data to the speaker (S106).

If an incoming call arrives during the above transmission, the telephone set 100 sends a pause command to the CD player unit 210 (S101).

The CD player unit 210 having received the pause command returns a response (S102), and stops its playing operation temporarily (S107).

Subsequently, the telephone set 100 sends an incoming-call notice tone to the speaker 300 (S103), so that the tone is reproduced from the speaker 300. The sound thus reproduced is brought to a stop automatically after a lapse of a predetermined time.

When the user has hung up the telephone set 100, the telephone set 100 sends a play command to the CD player unit 210 (S104).

Upon reception of this command, the CD player unit 210 returns a response (S105), and then resumes its playing operation (S109).

The example mentioned above is premised on that the packet format of control commands is standardized in the detail. In this case, it is ensured that any control command sent from the telephone set 100 can be interpreted by the CD player unit 210.

However, there may exist some cases where the packet format of the control commands is different, either entirely or partially, depending on the types of devices or makers thereof.

One exemplary case is such that, in the AV protocol packet of FIG. 6, the area relative to the contents of commands (play, stop, mute, etc.) is common but the format of option parameters is different.

FIG. 16 shows a setup procedure executed in such a case.

The flow from inquiry to authentication (S121-S130) in FIG. 16 is exactly the same as that from inquiry to authentication (S1-S10) in FIG. 8.

In this example, however, the telephone set 100 sends, after connection through authentication, a request to the CD player unit 210 for acquiring details of a command packet to be transmitted at the time of control (131).

This request packet contains data signifying the contents of commands (play, stop, mute, etc.). And a command packet containing default values in its option area is returned as a reply packet (S132).

Communications at steps S131 and S132 are executed correspondingly to the number of commands required for subsequent control.

When the telephone set 100 controls the CD player unit 210 hereafter, the packet returned here is sent as a command packet. The communication flow at the time of control is exactly the same as that in FIGS. 10, 13 and 15.

According to the present invention, a remote control signal is sent, upon arrival of an incoming call, either directly from a telephone set or via a communication adaptor to a home appliance such as an audio device which is remote-controllable by radio communication, and thus the output of the home appliance can be brought to a stop under such control, thereby enabling the user to easily notice arrival of the incoming call.

In the present invention, therefore, if the home appliance such as an audio device is remote-controllable through radio communication and is adapted for BT communication, it is possible to execute desired control from a telephone set in response to arrival of an incoming call. Consequently, it is not necessary to design the home appliance for complying with notice of an incoming call or to use the home appliance in combination with any additional unit. Further, due to employment of an authentication function in BT communication, only the specified home appliance alone can be stopped upon arrival of an incoming call. Thus, there exists no anxiety about erroneous response to any telephone call for some other person. And in case a plurality of home appliances are existent in the peripheral vicinity of the telephone set, it is possible to modify the arrangement in a manner to prohibit the telephone set from stopping a certain appliance or device.

What is claimed is:

1. A telephone set comprising:
   a connection means to execute a connecting process for enabling transmission and reception of an information signal by radio communication to and from a first home appliance which supports audio transmission or reception by radio communication with a second home appliance, the first home appliance being remote-controllable by a radio communication control protocol;
   a control means for generating, upon arrival of an incoming call, a remote control signal to the first home appliance; and
   a radio communication means for sending the remote control signal to the first home appliance by radio communication;
   wherein the radio communication means is operable to receive a confirmation signal from the first home appliance indicating that the first home appliance has received the remote control signal; and
   wherein the radio communication control protocol is used by the telephone set and the second home appliance to control the transmission of audio data by the first home appliance for output as sound by the second home appliance.

2. The telephone set according to claim 1, wherein the radio communication and the control protocol are the Bluetooth communication and control protocols.

3. The telephone set according to claim 1, wherein the remote control signal serves to stop the second home appliance from reproducing audio data.

4. The telephone set according to claim 3, wherein the remote control signal is a pause command to pause the transmission of audio data by the first home appliance.

5. The telephone set according to claim 3, wherein the remote control signal is a sound mute command to mute the reproduction of audio data by the second home appliance.

6. The telephone set according to claim 3, wherein the remote control signal further serves to execute another control for sending an incoming-call notice to the second home appliance, wherein audio data for the notice is generated by the telephone set and reproduced by the second home appliance.

7. The telephone set according to claim 3, wherein the control means further executes, upon termination of the call, a control action for resuming the reproduction of audio data by the second home appliance.

8. The telephone set according to claim 1, wherein the connection means executes a connecting process in advance and the connection is maintained or reestablished periodically so as to enable fast transmission and reception of the information signal to and from the first home appliance without having to reestablish the connection before transmitting a remote control signal or audio data.

9. The telephone set according to claim 1, wherein the connection means executes a connecting process upon arrival of an incoming call so as to enable transmission and reception of the information signal to and from the first home appliance.

10. The telephone set according to claim 1, wherein the connection means releases the connection with the first home appliance upon termination of the call.

11. The telephone set according to claim 10, wherein a connection between the first home appliance and second home appliance is maintained when releasing the connection between the telephone set and the first home appliance.

12. The telephone set according to claim 1, wherein the control means simultaneously generates, upon arrival of an incoming call, the remote control signal to the first home appliance.

13. The telephone set according to claim 1, further comprising a control signal acquisition means to send a request packet to the first home appliance identifying a first remote control command, and receive a command packet from the first home appliance indicating a remote control signal for implementing the first remote control command.

14. The telephone set according to claim 1, wherein the telephone set does not ring upon arrival of the incoming call.

15. The telephone set according to claim 1, wherein the connection means transmits a message to determine if the first home appliance is within communication range.

16. The telephone set according to claim 1, wherein the first home appliance is not remote-controllable until an authentication procedure is executed between the telephone set and the first home appliance.

17. The telephone set according to claim 16, wherein the authentication procedure is to verify a password preset in the telephone set and the first home appliance.

18. The telephone set according to claim 1, wherein the telephone set is a master device for determining a frequency hopping sequence and the first appliance is a slave device in a first network, and the first appliance is a master device for determining a frequency hopping sequence and the second appliance is a slave device in a second network.

19. A communication adaptor installable in a telephone set, comprising:
 a connection means to execute a connecting process for enabling transmission and reception of an information signal by radio communication to and from a first home appliance which supports audio transmission or reception by radio communication with a second home appliance, the first home appliance being remote-controllable by a radio communication control protocol;
 a control means for generating, upon arrival of an incoming call, a remote control signal to the first home appliance; and
 a radio communication means for sending the remote control signal to the first home appliance by the radio communication;
 wherein the radio communication means is operable to receive a confirmation signal from the first home appliance indicating that the first home appliance has received the remote control signal; and
 wherein the radio communication control protocol is used by the communication adaptor and the second home appliance to control the transmission of audio data by the first home appliance for output as sound by the second home appliance.

20. A home appliance control method comprising the steps of:
 enabling transmission and reception of an information signal by radio communication to and from a first home appliance which supports audio transmission or reception by the radio communication with a second home appliance, the first home appliance being remote-controllable by a radio communication means using a control protocol;
 generating, upon arrival of an incoming call, a remote control signal to the first home appliance;
 sending the remote control signal to the first home appliance by radio communication; and
 receiving a confirmation signal from the first home appliance indicating that the first home appliance has received the remote control signal;
 wherein the radio communication control protocol is used by a telephone set and the second home appliance to control the transmission of audio data by the first home appliance for output as sound by the second home appliance.

21. The home appliance control method according to claim 20, wherein the radio communication and the control protocol are the Bluetooth communication and control protocols.

22. The home appliance control method according to claim 20, wherein the remote control signal serves to stop the second home appliance from reproducing audio data.

23. The home appliance control method according to claim 22, wherein the remote control signal is a pause command to pause the transmission of audio data by the first home appliance.

24. The home appliance control method according to claim 22, wherein the remote control signal is a sound mute command to mute the reproduction of audio data by the second home appliance.

25. The home appliance control method according to claim 22, wherein the remote control signal further serves to execute another control for sending an incoming-call notice tone to the second home appliance, wherein audio data for the notice is received and reproduced by the second home appliance.

26. The home appliance control method according to claim 22, wherein the remote control signal further serves to execute, upon termination of the call, another control for resuming the reproduction of audio data by the second home appliance.

27. The home appliance control method according to claim 20 wherein, at the connection processing step, the connecting process is executed in advance and the connection is maintained or reestablished periodically so as to enable fast transmission and reception of the information signal to and from the first home appliance without having to reestablish the connection before transmitting a remote control signal or audio data.

28. The home appliance control method according to claim 20 wherein, at the connection processing step, the connecting process is executed upon arrival of an incoming call so as to enable transmission and reception of the information signal to and from the first home appliance.

29. The home appliance control method according to claim 20, further comprising a connection releasing step for releasing the connection with the first home appliance upon termination of the call.

30. The home appliance control method according to claim 20 wherein, at the remote control signal generating step, the remote control signal is simultaneously generated, upon arrival of an incoming call, to the first home appliance.

31. The home appliance control method according to claim 20 wherein, at the remote control signal generating step, a request packet is sent to the first home appliance identifying a first remote control command, and a command packet is received from the first home appliance indicating a remote control signal for implementing the first remote control command.

32. A program recording medium where a home appliance control program is recorded in such a manner as to be readable and executable by a computer, the control program comprising the steps of:

enabling transmission and reception of an information signal by radio communication to and from a first home appliance which supports audio transmission or reception by the radio communication with a second home appliance, the first home appliance being remote-controllable by a radio communication control protocol;

generating, upon arrival of an incoming call, a remote control signal to the first home appliance;

sending the remote control signal to the first home appliance by the radio communication; and receiving a confirmation signal from the first home appliance indicating that the first home appliance has received the remote control signal;

wherein the radio communication control protocol is used by a telephone set and the second home appliance to control the transmission of audio data by the first home appliance for output as sound by the second home appliance.

33. The program recording medium according to claim 32, wherein the radio communication and the control protocol are the Bluetooth communication and control protocols.

34. The program recording medium according to claim 32, wherein the remote control signal serves to stop the second home appliance from reproducing audio data.

35. The program recording medium according to claim 34, wherein the remote control signal is a pause command to pause the transmission of audio data by the first home appliance.

36. The program recording medium according to claim 34, wherein the remote control signal is a sound mute command to mute the reproduction of audio data by the second home appliance.

37. The program recording medium according to claim 34, wherein the remote control signal further serves to execute another control for sending an incoming-call notice tone to the second appliance, wherein audio data for the notice is received and reproduced by the second home appliance.

38. The program recording medium according to claim 34, wherein the remote control signal further serves to execute, upon termination of the call, another control for resuming the reproduction of audio data by the second home appliance.

39. The program recording medium according to claim 32, wherein, at the connection processing step, the connecting process is executed in advance and the connection is maintained or reestablished periodically so as to enable fast transmission and reception of the information signal to and from the first home appliance without having to reestablish the connection before transmitting a remote control signal or audio data.

40. The program recording medium according to claim 32, wherein, at the connection processing step, the connecting process is executed upon arrival of an incoming call so as to enable transmission and reception of the information signal to and from the first home appliance.

41. The program recording medium according to claim 32, wherein the control program further comprises a connection releasing step for releasing the connection with the first home appliance upon termination of the call.

42. The program recording medium according to claim 32 wherein, at the remote control signal generating step, the remote control signal is simultaneously generated, upon arrival of an incoming call, to the first home appliance.

43. The program recording medium according to claim 32 wherein, at the remote control signal generating step, a request packet is sent to the first home appliance identifying a first remote control command, and a command packet is received from the first home appliance indicating a remote control signal for implementing the first remote control command.

* * * * *